(12) United States Patent
Hoye

(10) Patent No.: US 11,290,678 B2
(45) Date of Patent: *Mar. 29, 2022

(54) DIGITAL VIDEO RECORDER PRIVACY

(71) Applicant: Lytx, Inc., San Diego, CA (US)

(72) Inventor: Brett Hoye, San Marcos, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,807

(22) Filed: Oct. 28, 2020

(65) Prior Publication Data

US 2021/0099664 A1 Apr. 1, 2021

Related U.S. Application Data

(63) Continuation of application No. 16/353,928, filed on Mar. 14, 2019, now Pat. No. 10,855,948.

(51) Int. Cl.
*H04N 5/77* (2006.01)
*G01C 21/32* (2006.01)
*G01S 19/13* (2010.01)
*G06F 3/04847* (2022.01)

(52) U.S. Cl.
CPC ............... *H04N 5/77* (2013.01); *G01C 21/32* (2013.01); *G01S 19/13* (2013.01); *G06F 3/04847* (2013.01)

(58) Field of Classification Search
None
See application file for complete search history.

(56) References Cited

U.S. PATENT DOCUMENTS

| 8,930,072 B1 * | 1/2015 | Lambert | ................ B60R 1/00 |
| | | | 701/36 |
| 2007/0268368 A1 | 11/2007 | Bradford | |
| 2008/0249701 A1 | 10/2008 | Zhuang | |
| 2014/0375807 A1 | 12/2014 | Muetzel | |
| 2015/0002674 A1 | 1/2015 | Kleve | |
| 2018/0357898 A1 * | 12/2018 | Kamini | .............. H04N 5/23293 |

* cited by examiner

*Primary Examiner* — Heather R Jones
(74) *Attorney, Agent, or Firm* — Van Pelt, Yi & James LLP

(57) ABSTRACT

A system includes an outward facing video camera, a digital video recorder, a geolocation device, an interface, and a processor. The interface is configured to receive video data from the outward facing vehicle camera and receive location data from the geolocation device. The processor is configured to determine a digital video recorder storing state; disable transfer of video data to the digital video recorder in response to the digital video recorder storing state being a prohibited state; and enable transfer of the video data from the outward facing video camera to the digital video recorder for storage in response to the digital video recorder storing state being not the prohibited state.

17 Claims, 9 Drawing Sheets

US 11,290,678 B2

DIGITAL VIDEO RECORDER PRIVACY

CROSS REFERENCE TO OTHER APPLICATIONS

This application is a continuation of U.S. patent application Ser. No. 16/353,928 entitled DIGITAL VIDEO RECORDER PRIVACY filed Mar. 14, 2019 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors—for example, video recorders, audio recorders, accelerometers, gyroscopes, vehicle state sensors, global positioning systems (GPS), etc., that report data, which is used to determine the occurrence of an anomalous event. A vehicle event recorder including a digital video recorder system continuously records video from a video recorder (e.g., from an outward facing video recorder and/or an inward facing recorder) to the digital video recorder system. Continuous recording allows all data captured by video recorders to be stored for potential later review. However, in some areas, continuous recording is illegal, not allowed, or not appropriate, creating a problem.

BRIEF DESCRIPTION OF THE DRAWINGS

Various embodiments of the invention are disclosed in the following detailed description and the accompanying drawings.

DETAILED DESCRIPTION

Figure 1:
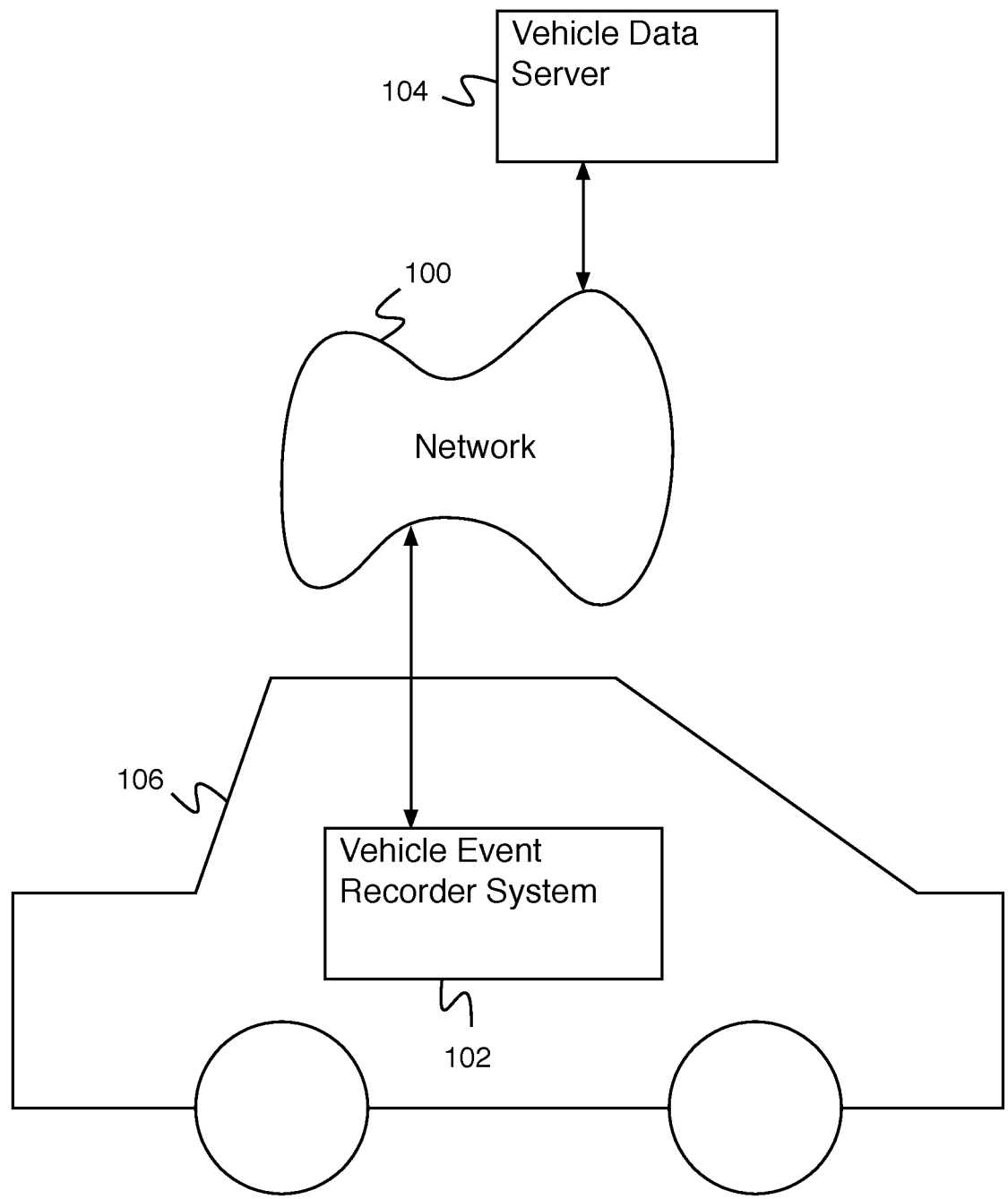
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system comprises an outward facing video camera, a digital video recorder, a geolocation device, an interface configured to receive video data from the outward facing vehicle camera and receive location data from the geolocation device, and a processor configured to determine a digital video recorder storing state, in response to the digital video recorder storing state being a prohibited state, disable transfer of video data to the digital video recorder, and in response to the digital video recorder storing state being not the prohibited state, enable transfer of the video data from the outward facing video camera to the digital video recorder for storage. In some embodiments, the system additionally comprises a memory coupled to the processor and configured to provide the processor with instructions.

A system for digital video recorder privacy comprises a system for determining whether to enable or disable transfer of video data to a digital video recorder (DVR). The system for DVR privacy receives video data (e.g., from an outward facing video camera, an inward facing video camera, a rearward facing video camera, etc.) and location data from a geolocation device (e.g., a global positioning system) and determines a DVR storing state. For example, the DVR storing state is based at least in part on the location data. The DVR storing state comprises a prohibited state or a not prohibited state. In response to the DVR storing state being a prohibited state, transfer of video data to the DVR is disabled, and in response to DVR storing state not being a prohibited state, transfer of the video data is enabled from the video camera to the DVR for storage. A DVR storing state is determined for an outward facing video camera, and can additionally be determined for an inward facing video camera. Transfer of data from an outward facing video camera to the DVR and from an inward facing video camera to the DVR is each controlled independently.

In some embodiments, the determination of a DVR storing state is based at least in part on a map region (e.g., a geofence region indicated on the map). For example, a map comprises a geofence region indicating that transfer of data from an inward facing camera to a DVR system and from an outward facing camera to a DVR system is enabled. In the event that the geolocation data indicates that the vehicle location is within the geofence region, transfer of data from the inward facing camera to the DVR system is enabled and/or transfer of data from the outward facing camera to the DVR system is enabled. In the event that the geolocation data indicates that the vehicle location is not within the geofence region, DVR transfer rules are determined using a different enclosing region or using default rules. The DVR transfer rules can be extended to include time of day, day of the week or month, month or season of the year, or any other appropriate time based criterion in addition to the vehicle location. For example, the DVR system may be enabled during non-working hours within a geofence region but disabled during working hours within that region. Or, for another example, the DVR system may be enabled during the week outside of a geofence region but disabled during the weekend everywhere. Or, for another example, the DVR system may be disabled during the summer within a geofenced region but enabled during the fall, winter, and spring within the geofenced region. A user using the system for DVR privacy (e.g., using the vehicle event recorder system or using a server system in communication with the vehicle event recorder system) is able to input new geofence regions using a geofence user interface. For example, a new geofence region comprises a polygonal region, a region follows geographic boundaries, a region following political boundaries, or a region comprising a military location. In various embodiments, a region corresponds to or is specified by indicating a specification of a country, a state, a county, a municipality, a property line, or any other appropriate boundary or area. Note that the geofence can indicate a region where the DVR system is enabled or disabled. In some instances, DVR recording is only enabled when the vehicle is within that geofenced region. Whereas, in some instances, DVR recording is only disabled when the vehicle is with the geofenced region.

In addition to geolocation based rules for indicating a DVR storage state, geolocation based rules additionally indicate an event detection state. For example, the vehicle event recorder stores a small duration of video data in a buffer and analyzes the stored video and other stored sensor data in order to identify an anomalous event. In response to identification of an anomalous event, the anomalous event is flagged and the data stored for future review. Storage of video data in the buffer and event detection are enabled and/or disabled according to a geolocation and geofence regions independently from the DVR storage state.

The system for digital video recorder privacy improve the vehicle event recorder device by enabling automatic management of transfer of video data and/or storage of video data using geolocation information that is specifiable using a user interface. The automatic management of the digital video recorder improves the system by ensuring appropriate functionality of the recorder in compliance with privacy rules, prohibitions to record data, or other imposed restraints on technical function.

FIG. 1 is a block diagram illustrating an embodiment of a system including a vehicle event recorder. Vehicle event recorder system 102 comprises a vehicle event recorder mounted in a vehicle (e.g., a car, a truck, a trailer associated with a semi truck, a van, a bus, a commercial vehicle, etc.). Vehicle event recorder system 102 comprises a vehicle event recorder and sensor systems. The sensor systems comprise a set of sensors, for example, one or more video recorders, audio recorders, accelerometers, gyroscopes, vehicle sensors, proximity sensors, a global positioning system (GPS), outdoor temperature sensors, moisture sensors, laser line tracker sensors, sound navigation and ranging systems (SONAR), light detection and ranging systems (LIDAR), range finder sensors, time information (e.g. based on GPS, Cellular Tower data or some other time source), etc. Vehicle sensors comprise internal vehicle sensors, for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. The vehicle event recorder comprises a system for receiving and processing sensor data. In some embodiments, the vehicle event recorder captures data (e.g., collects data, stores received data, etc.) or marks data in response to a trigger—for example, a trigger associated with a trigger threshold. Capturing data in response to a trigger comprises receiving data, processing the data, determining to capture more data (e.g., by determining that a processed data value is greater than a threshold), and capturing the more data. Marking data in response to a trigger comprises receiving data, processing data, indicating data of interest, storing data, and storing a mark associated with the stored data.

Processing sensor data comprises filtering data, identifying patterns in data, detecting events, etc. Vehicle event recorder system 102 is mounted on vehicle 106 in any appropriate location—for example, the chassis, the front grill, the dashboard, the rear-view mirror, the rear window or wall, the floor, etc. There are times when vehicle event recorder system 102 comprises multiple units mounted in different locations within vehicle 106 instead of a single unit, particularly when there are space constraints for a given location (e.g., behind the rear view mirror) and more space is required to house electronic components. Vehicle event recorder system 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder system 102 communicates with vehicle data server 104 via network 100. Vehicle data server 104 receives data, processes data, stores data, requests more data, provides stored data, etc.

For example, vehicle event recorder system 102 comprises a system comprising an outward facing video camera, a digital video recorder, a geolocation device, an interface configured to receive video data from the outward facing vehicle camera and receive location data from the geolocation device, and a processor configured to determine a digital video recorder storing state, in response to the digital video recorder storing state being a prohibited state, disable transfer of video data to the digital video recorder, and in response to the digital video recorder storing state being not the prohibited state, enable transfer of the video data from the outward facing video camera to the digital video recorder for storage.

Figure 2:
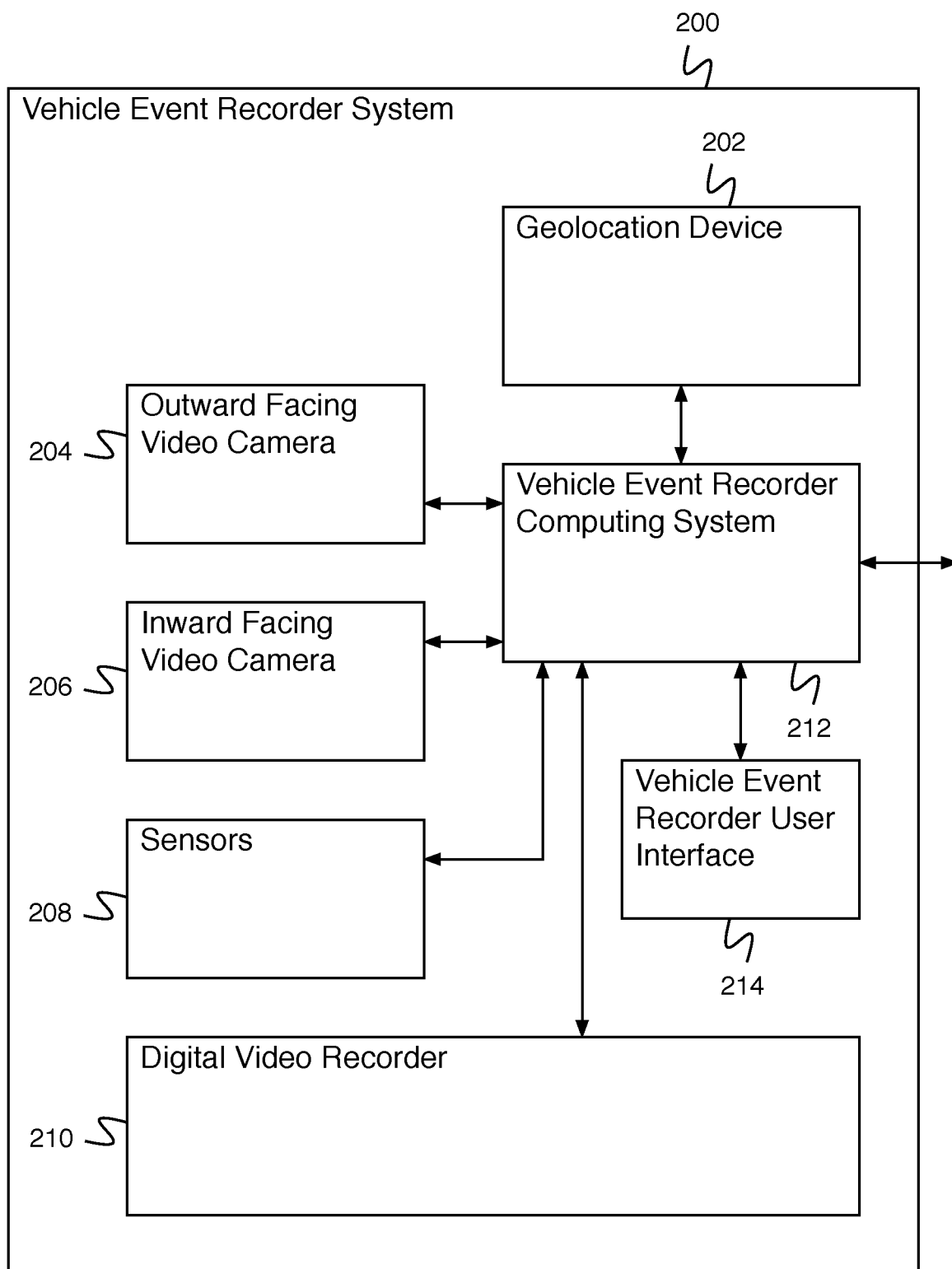
FIG. 2 is a block diagram illustrating an embodiment of a vehicle event recorder system.

FIG. 2 is a block diagram illustrating an embodiment of a vehicle event recorder system. In some embodiments, vehicle event recorder system 200 comprises vehicle event recorder system 102 of FIG. 1. In the example shown, vehicle event recorder system 200 comprises vehicle event recorder computing system 212 (e.g., a computing system for receiving data, processing data, providing interface data, communicating via a network, etc.). Vehicle event recorder system 200 additionally comprises geolocation device 202. For example, geolocation device 202 comprises a GPS device. Vehicle event recorder system 200 additionally comprises outward facing video camera 204 and inward facing video camera 206. For example, outward facing video camera 204 comprises a video camera facing the road ahead of the vehicle and inward facing video camera 206 comprises a video camera facing the driver. In various embodiments, vehicle event recorder system 200 additionally comprises a video camera facing the road behind the vehicle, a video camera facing out the left or right side of the vehicle, a video camera facing the passenger, etc. Vehicle event recorder system 200 additionally comprises sensors 208. Sensors 208 comprise audio recorders, accelerometers, gyroscopes, vehicle sensors, proximity sensors, outdoor temperature sensors, moisture sensors, laser line tracker sensors, SONAR systems, LIDAR systems, radio detection and ranging (RADAR) systems, range finder sensors, etc. Vehicle sensors comprise internal vehicle sensors, for example a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder system 200 additionally comprises digital video recorder 210. Digital video recorder 210 comprises a digital video recorder for recording digital video data. For example, digital video recorder 210 comprises a large capacity digital storage device for recording as much digital video data as is desired—for example, continuous digital video data received from outward facing video camera 204, inward facing video camera 206, and/or any other appropriate video camera or cameras, for a period of time comprising hours, days, weeks, etc. Vehicle event recorder user interface comprises an interface to vehicle event recorder system 200. For example, vehicle event recorder user interface 214 comprises one or more indicator lights for indicating DVR recording disabled or event detection disabled, a map display for showing a current map location, a current map region, a recording or event detection status, for receiving an indication of a map region, etc.

Figure 3:
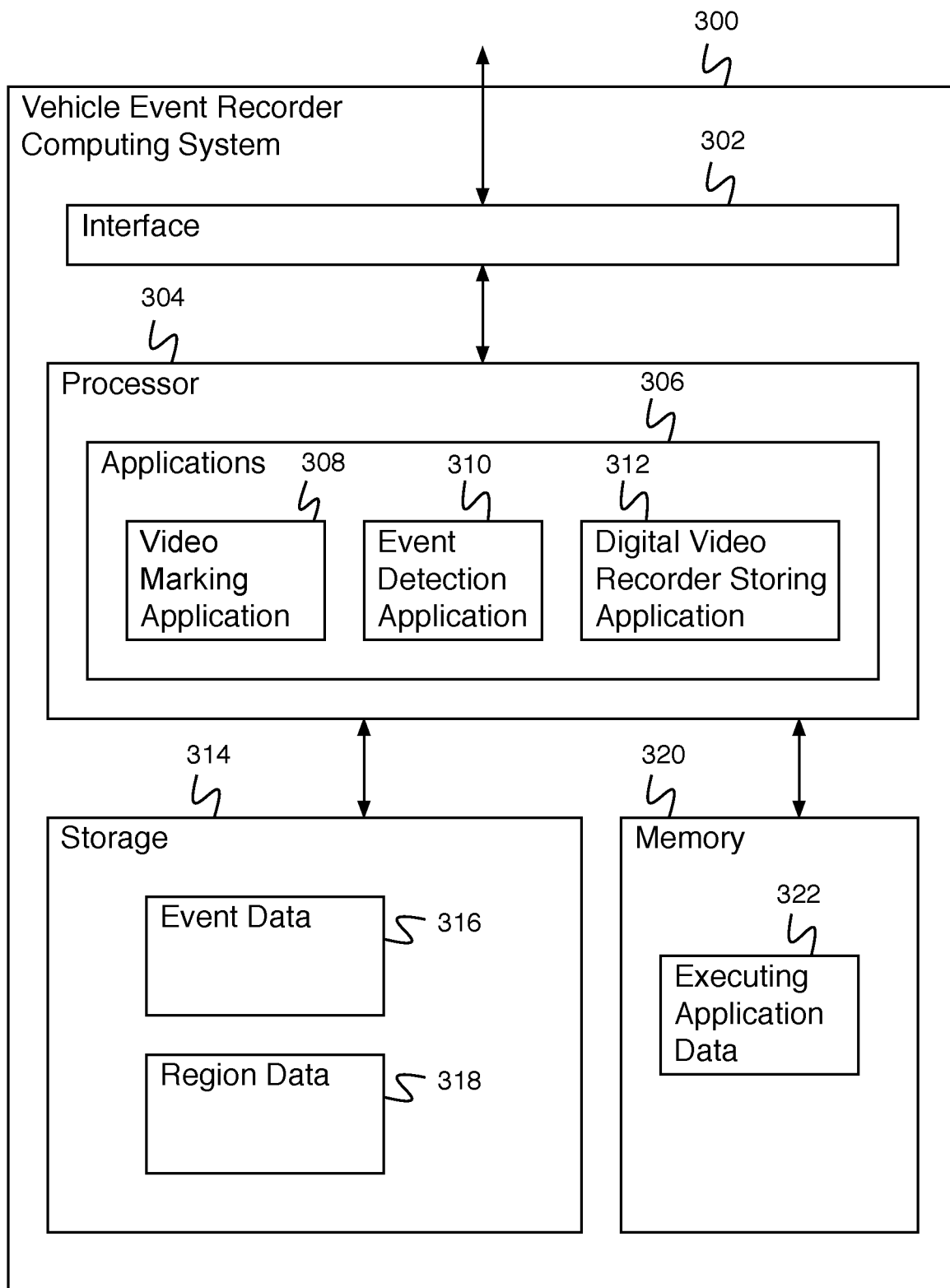
FIG. 3 is a block diagram illustrating an embodiment of a vehicle event recorder.

FIG. 3 is a block diagram illustrating an embodiment of a vehicle event recorder. In some embodiments, vehicle event recorder 300 comprises vehicle event recorder computing system 212 of FIG. 2. In the example shown, vehicle event recorder 300 comprises interface 302. Interface 302 comprises an interface for communicating with external systems using a network. Interface 302 also comprises an interface for communicating with other elements of a vehicle recorder system (e.g., for receiving location data from a geolocation device, for receiving video data from an outward facing vehicle camera, for receiving sensor data, for providing an indication to enable or disable DVR storage, for communicating with a user interface, etc.), a vehicle data server (e.g., for providing sensor data, for providing indications of anomalous events,), etc. Processor 304 comprises a processor for executing applications 306. Applications 306 comprises video marking application 308, event detection application 310, and digital video recorder storing application 312. Video marking application 308 comprises an application for determining and/or storing one or more marks associated with video data of interest (e.g., event data). Event detection application 310 comprises an application for analyzing data and determining an occurrence of an anomalous event. Event detection application 310 analyzes video data, audio data, sensor data, etc. In the event that event detection application 310 determines that an anomalous event has occurred, event data associated with the event is stored in event data 316. Digital video recorder storing application 312 comprises an application for determining whether to store video data in a digital video recorder. For example, digital video recorder storing application 312 comprises an application for determining a digital DVR state, in response to the DVR storing state being a prohibited state, disabling transfer of video data to the DVR, and in response to the DVR storing state being not the prohibited state, enabling transfer of the video data from the outward facing video camera to the DVR for storage. In some embodiments, processor 304 comprises other applications, including any other appropriate applications (e.g., a data collection application, a data viewing application, a driver health determination application, a data analysis application, etc.). Vehicle event recorder computing system 300 additionally comprises storage 314. Storage 314 comprises event data 316 and region data 318. Event data 316 comprises video data, sensor data, event data (e.g., an event time, an event location, sensor data indicating an event, an event magnitude, etc.), or any other appropriate data. Region data 318 comprises region data indicating region boundaries and recording rules associated with regions. Vehicle event recorder 300 additionally comprises memory 320. Memory 320 comprises executing application data 322 comprising data associated with applications 306.

Figure 4:
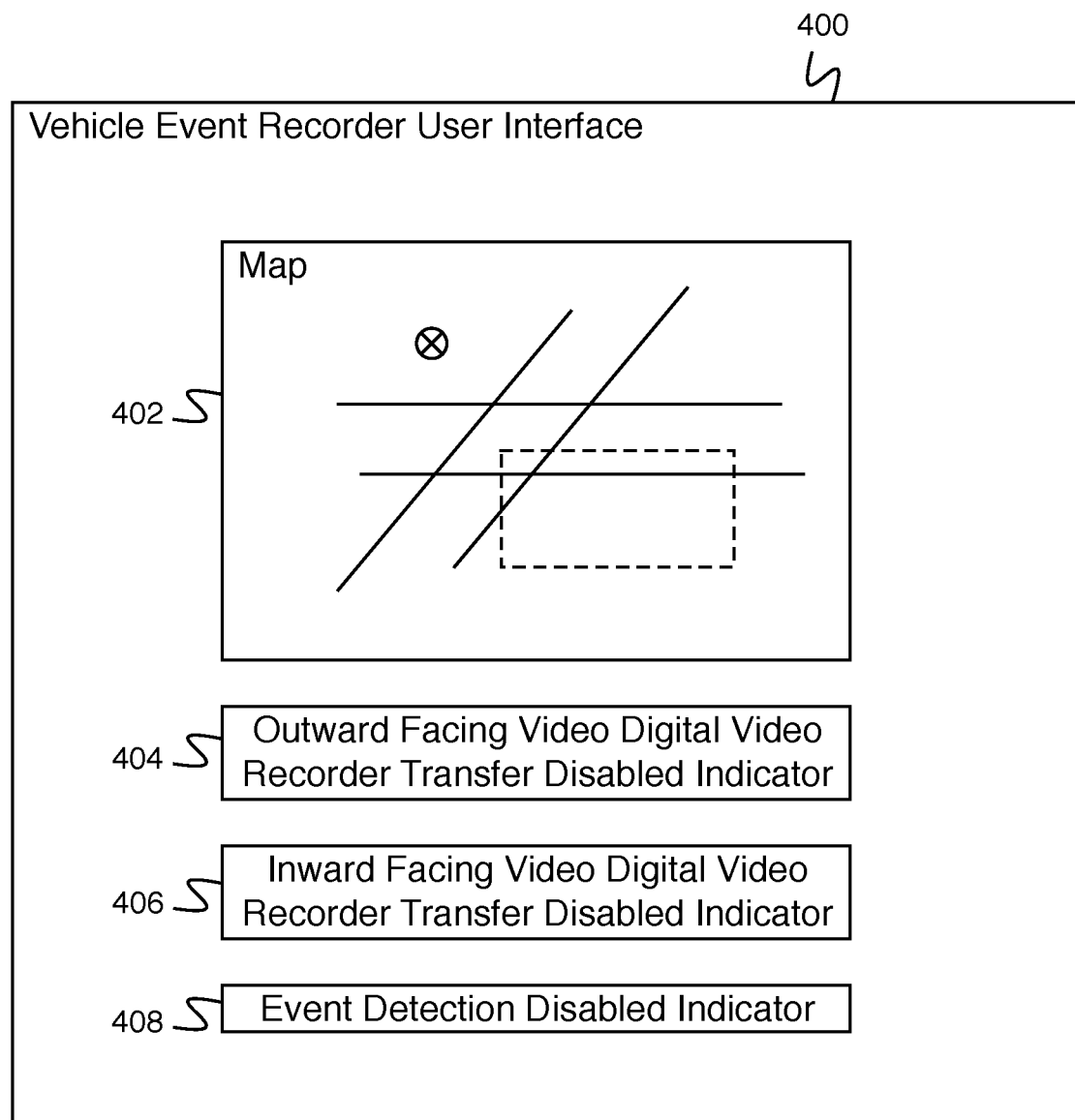
FIG. 4 is a block diagram illustrating an embodiment of a vehicle event recorder user interface.

FIG. 4 is a block diagram illustrating an embodiment of a vehicle event recorder user interface. In some embodiments, vehicle event recorder user interface 400 implements vehicle event recorder user interface 214 of FIG. 2. In the example shown, vehicle event recorder 400 comprises map 402. For example, map 402 comprises road indications, region indications, location information, etc. In some embodiments, vehicle event recorder user interface 400 does not comprise a map. Vehicle event recorder user interface 400 additionally comprises indicator 404, indicator 406, and indicator 408. Indicator 404 comprises an outward facing video digital video recorder transfer disabled indicator (e.g., an indicator—e.g., a light emitting diode (LED)—for indicating when digital video recorder transfer from an outward facing camera is disabled). Indicator 406 comprises an inward facing video digital video recorder transfer disabled indicator. Indicator 408 comprises an event detection disabled indicator.

Figure 5:
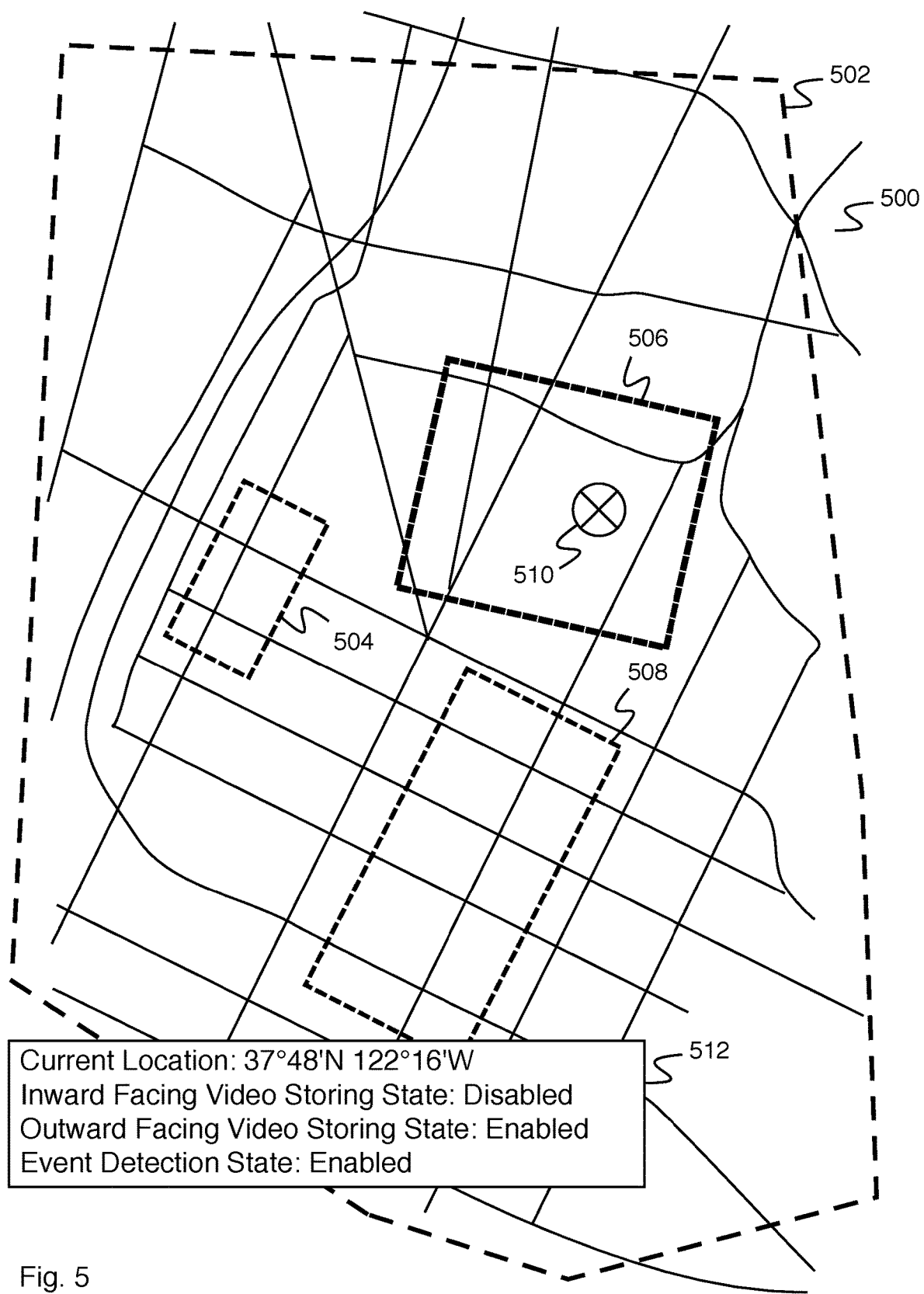
FIG. 5 is a diagram illustrating an embodiment of a map.

FIG. 5 is a diagram illustrating an embodiment of a map. In some embodiments, map 500 comprises map 402 of FIG. 4. In the example shown, map 500 comprises region 502, region 504, region 506, and region 508. Each region comprises its own set of rules describing DVR storing state and event detection state. Region 504, region 506, and region 508 are nested inside of region 502. For example, in the event a vehicle is within region 504, the state rules of region 504 apply to the vehicle. When the vehicle exits region 504, the state rules of region 502 apply to the vehicle. In that case the smaller region rules take precedence over the larger region rules. Map 500 comprises location data indicator 510 for indicating current location data. In the example shown, location data indicator 510 indicates that the current location is within location region 506. Region 506 is indicated on map 500 using a heavy line to indicate that region 506 is the location region associated with the current location data. Map 500 additionally comprises data indicator box 512 for indicating a data set. In the example shown, data indicator box 512 indicates that the current location is 37°48'N 122°16'W, the inward facing video storing state is disabled, the outward facing video storing state is enabled, and the event detection state is enabled.

In various embodiments, the rules of a larger region supercede rules of a smaller nested region, the more strict rule(s) of either the small nested region or larger region apply, the less strict rule(s) of either the small nested region or larger region apply, or any other appropriate manner of combining rules for regions.

In some embodiments, map 500 comprises a map user interface for user indication of a map region. For example, a user using the map user interface makes an indication to the map user interface to define a new map region, makes an indication of the digital video recorder storing states and other data associated with the new map region, and makes an indication that the map definition is complete. For example, the new map region comprises a polygon, the new map region follows geographic boundaries, the new map region follows political boundaries, or the new map region comprises a military location.

Figure 6:
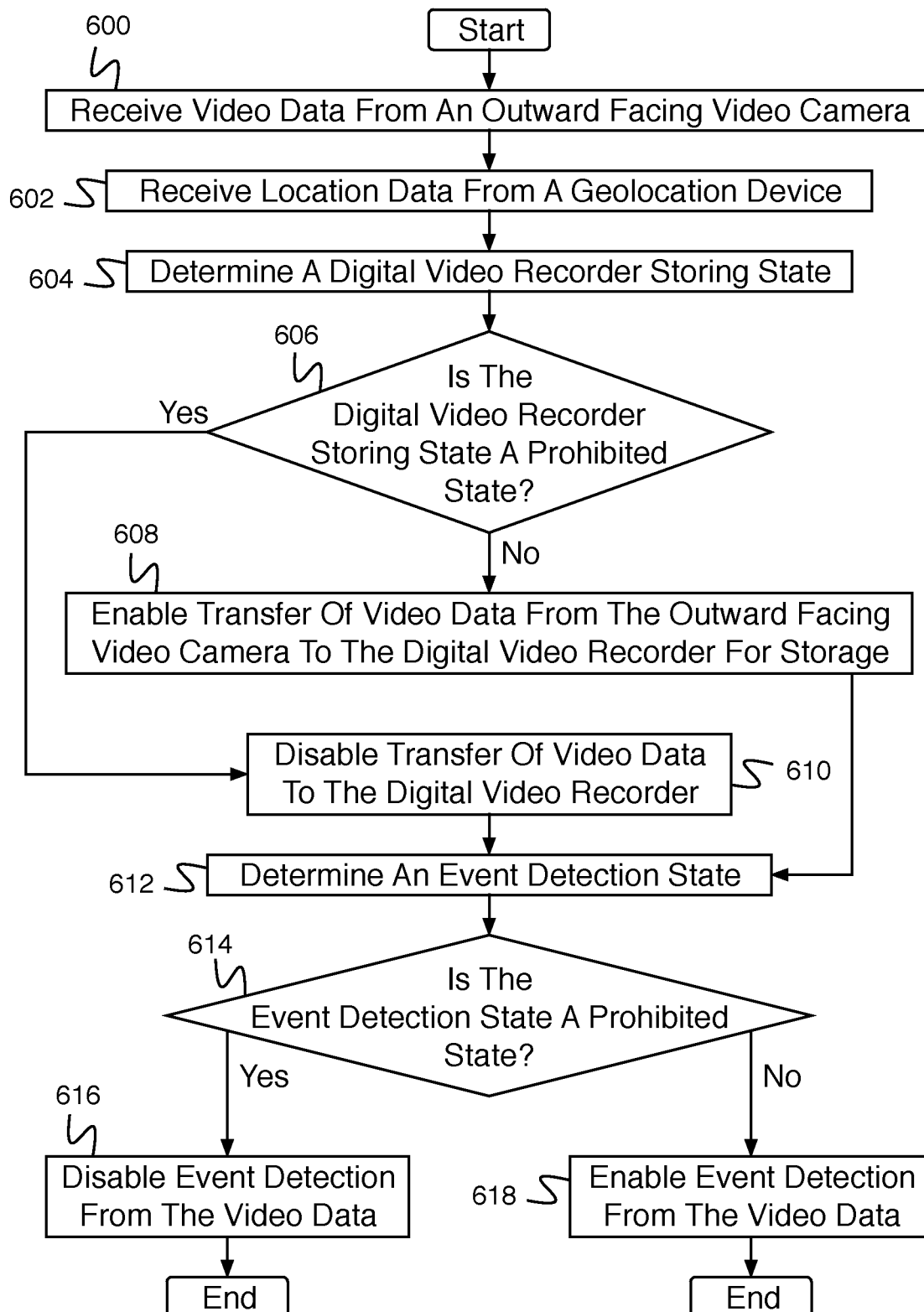
FIG. 6 is a flow diagram illustrating an embodiment of a process for digital video recorder privacy.

FIG. 6 is a flow diagram illustrating an embodiment of a process for digital video recorder privacy. In some embodiments, the process of FIG. 6 is executed by vehicle event recorder system 102 of FIG. 1. In the example shown, in 600, video data is received from an outward facing video camera. In 602, location data is received from a geolocation device. In 604, a digital video recorder storing state is determined. In 606, in the event the digital video recorder storing state comprises a prohibited state, control passes to 610. In 610, transfer of video data to the digital video recorder is disabled, and control then passes to 612. In 606, in the event the digital video recorder storing state does not comprise a prohibited state, control passes to 608. In 608, transfer of video data from the outward facing video camera to the digital video recorder for storage is enabled, and control then passes to 612. In 612, an event detection state is determined. In 614, in the event the event detection state comprises a prohibited state, control passes to 616. In 616, event detection from the video data is disabled, and the process then ends. In 614, in the event the event detection state does not comprise a prohibited state, control passes to 618. In 618, event detection from the video data is enabled, and the process ends.

Figure 7:
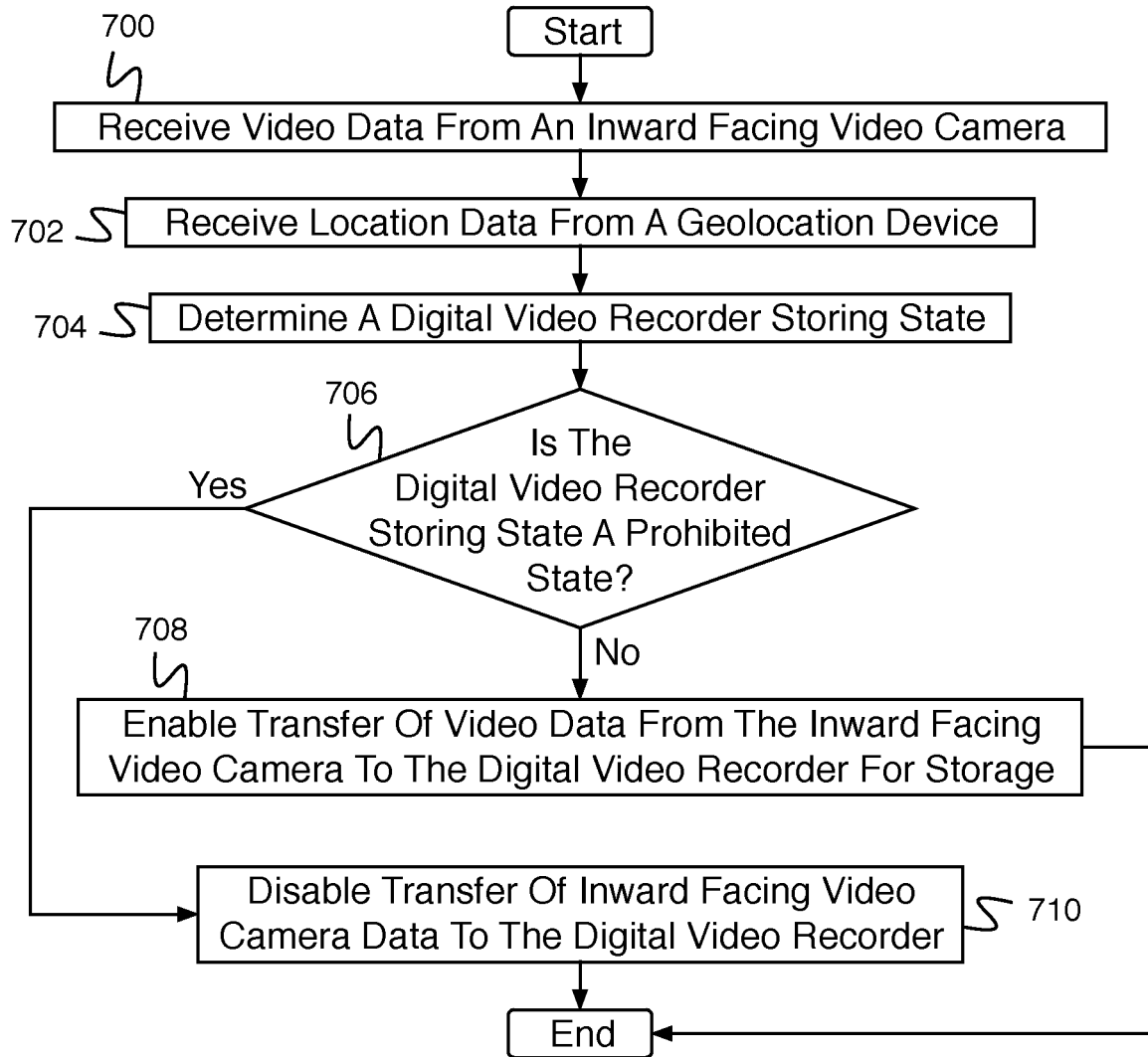
FIG. 7 is a flow diagram illustrating an embodiment of a process for digital video recorder privacy.

FIG. 7 is a flow diagram illustrating an embodiment of a process for digital video recorder privacy. In some embodiments, the process of FIG. 7 is executed by vehicle event recorder system 102 of FIG. 1. For example, the process of FIG. 7 is executed synchronously with the process of FIG. 6. In the example shown, in 700, video data is received from an inward facing video camera. In 702, location data is received from a geolocation device. In 704, a digital video recorder storing state is determined. In 706, in the event the digital video recorder storing state does not comprise a prohibited state, control passes to 708. In 708, transfer of video data from the inward facing video camera to the digital video recorder for storage is enabled, and the process then ends. In 706, in the event the digital video recorder storing state comprises a prohibited state, control passes to 710. In 710, transfer of inward facing video camera data to the digital video recorder is disabled, and the process ends.

Figure 8:
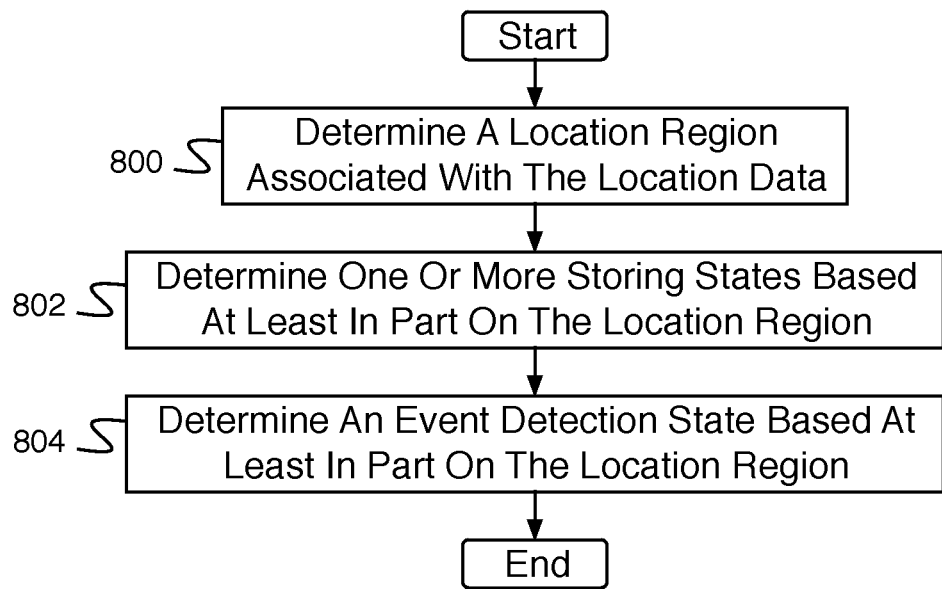
FIG. 8 is a flow diagram illustrating an embodiment of a process for determining a digital video recorder storing state.

FIG. 8 is a flow diagram illustrating an embodiment of a process for determining a digital video recorder storing state. In some embodiments, the process of FIG. 8 implements 604 of FIG. 6 or 704 of FIG. 7. In the example shown, in 800, a location region associated with the location data is determined. In 802, one or more storing states based at least in part on the location region are determined. For example, the one or more storing states comprise one or more of an outward facing camera storing state, an inward facing camera storing state, a forward facing camera storing state, a rearward facing camera storing state, a left facing camera storing state, a right facing camera storing state, a driver facing camera storing state, a passenger facing camera storing state, etc. In 804, an event detection state is determined based at least in part on the location region.

Figure 9:
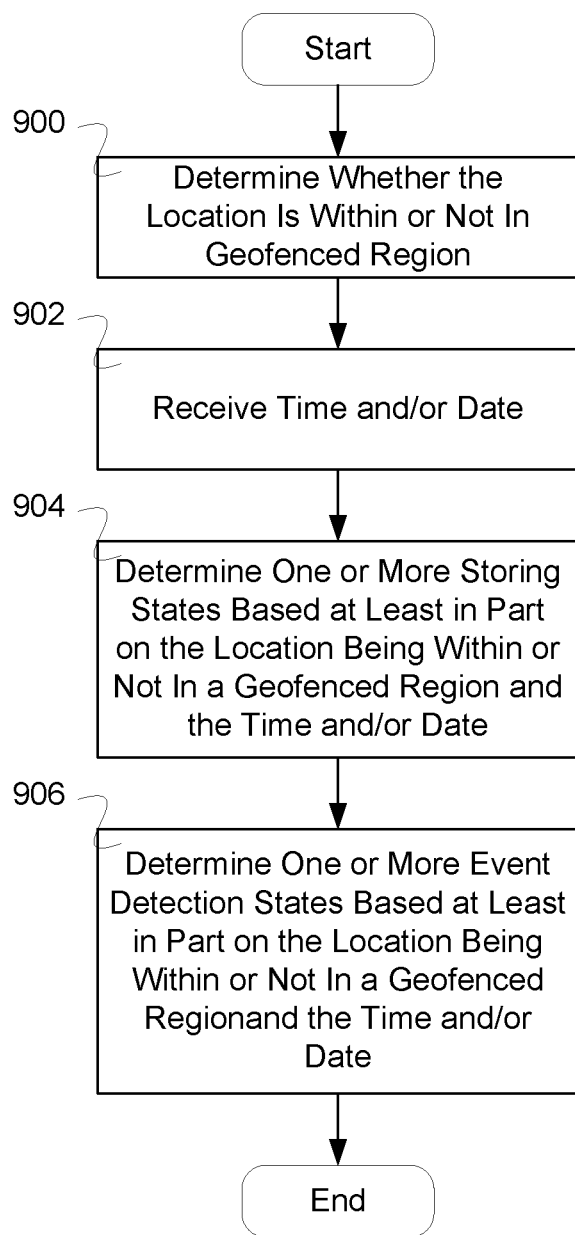
FIG. 9 is a flow diagram illustrating an embodiment of a process for determining a digital video recorder storing state.

FIG. 9 is a flow diagram illustrating an embodiment of a process for determining a digital video recorder storing state. In some embodiments, the process of FIG. 9 implements 604 of FIG. 6 or 704 of FIG. 7. In the example shown, in 900, it is determined whether the location is within or not in geofenced region. For example, the location is checked to see whether it is within a geofenced region or not in the geofenced region. In 902, the time and/or date is/are received. For example, the time and/or date is/are received from a GPS, a cell tower, a network, and or any other appropriate time and/or date source. In 904, one or more storing states is/are determined based at least in part on the location being within or not in a geofenced region and the time and/or date. For example, one or more storing states is/are determined based on being within or not in a geofenced area and depending on the time/date. The storing state might be prohibited or allowed based on being in a region or being outside a region or being during a time period or being not in a time period or being within a date range or being outside a date range. In some embodiments, the storing state is determined based on a logic flow using information regarding location, time, date, or any other appropriate information. In 906, one or more event detection states is/are determined based at least in part on the location being within or not in a geofenced region and the time and/or date. For example, one or more event detection states is/are determined based on being within or not in a geofenced area and depending on the time/date. The event detection state might be prohibited or allowed based on being in a region or being outside a region or being during a time period or being not in a time period or being within a date range or being outside a date range. In some embodiments, the event detection state is determined based on a logic flow using information regarding location, time, date, or any other appropriate information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   an outward facing video camera;
   a digital video recorder;
   a geolocation device;
   an interface configured to:
      receive video data from the outward facing vehicle camera; and receive location data from the geolocation device; and a processor configured to:
- determine a digital video recorder storing state, wherein the digital video recorder storing state is determined based at least in part on a time and/or a date, comprising to:
  - determine whether the digital video recorder storing state is in a prohibited state based on the location being located within a geofenced region, the time and/or the date, comprising to:
    - perform one or more of the following:
      1) determine whether a location is located within the geofenced region; and
         in the event that the location is located within the geofenced region, determine that the digital video recorder storing state is in the prohibited state;
      2) determine whether the date falls within a prohibited state date range; and
         in the event that the date falls within the prohibit state date range, determine that the digital video recorder storing state is in the prohibited state; and/or
      3) determine whether the time falls within the prohibited state time range; and
         in the event that the time falls within the prohibit state time range, determine that the digital video recorder storing state is in the prohibited state; and
    - perform one or more of the following:
      - determine the digital video recorder storing state based on the more strict rule of either a small nested region or a larger region;
      - determine the digital video recorder storing state based on the less strict rule of either the small nested region or the larger region;
      - determine the digital video recorder storing state based on a rule of the larger region superseding a rule of the small nested region; and/or
      - determine the digital video recorder storing state based on the rule of the small nested region superseding the rule of the larger region;
  - in response to the digital video recorder storing state being the prohibited state, disable transfer of video data to the digital video recorder; and
  - in response to the digital video recorder storing state being not the prohibited state, enable transfer of the video data from the outward facing video camera to the digital video recorder for storage.

2. The system of claim 1, further comprising an inward facing video camera.

3. The system of claim 2, wherein:
the interface is additionally configured to receive data from the inward facing video camera; and
the processor is additionally configured to:
- determine a digital video recorder inward storing state;
- in response to the digital video recorder inward storing state being a prohibited state, disable transfer of inward facing video camera data to the digital video recorder; and
- in response to the inward digital video recorder storing state being not the prohibited state, enable transfer of the inward facing video camera data from the inward facing video camera to the digital video recorder for storage.

4. The system of claim 1, wherein the geolocation device comprises a global positioning system.

5. The system of claim 1, wherein the interface is further configured to provide a map to a user interface display.

6. The system of claim 5, wherein the interface is further configured to provide an indication on the map of the location data.

7. The system of claim 5, wherein the interface is further configured to provide an indication on the map of a location region associated with the location data.

8. The system of claim 5, wherein the interface is further configured to provide an indication on the map of the digital video recorder storing state.

9. The system of claim 5, wherein the interface is additionally configured to receive a user indication indicating a region on the map.

10. The system of claim 9, wherein the region is a polygon, the region follows geographic boundaries, the region follows political boundaries, or the region comprises a military location.

11. The system of claim 1, wherein the digital video recorder storing state is determined based at least in part on the location data.

12. The system of claim 1, wherein the digital video recorder storing state is determined based at least in part on a logic flow.

13. The system of claim 1, wherein the system comprises an indicator for indicating that the transfer of video data to the digital video recorder is disabled.

14. The system of claim 1, wherein the processor is additionally configured to:
- determine an event detection state;
- in response to the event detection state being a prohibited state, disable event detection from the video data; and
- in response to the event detection state being not the prohibited state, enable event detection from the video data.

15. The system of claim 14, wherein the event detection state is based at least in part on one or more of the following: the location data, a time, a date, a geofenced region, and/or a logic flow.

16. A method comprising:
receiving video data from an outward facing vehicle camera;
receiving location data from a geolocation device;
determining, using a processor, a digital video recorder storing state, wherein the digital video recorder storing state is determined based at least in part on a time and/or a date, comprising:
- determining whether the digital video recorder storing state is in a prohibited state based on the location being located within a geofenced region, the time and/or the date, comprising to:
  - performing one or more of the following:
    1) determining whether a location is located within the geofenced region; and
       in the event that the location is located within the geofenced region, determining that the digital video recorder storing state is in the prohibited state;
    2) determining whether the date falls within a prohibited state date range; and
       in the event that the date falls within the prohibit state date range, determining that the digital video recorder storing state is in the prohibited state; and/or
    3) determining whether the time falls within the prohibited state time range; and in the event that the time falls within the prohibit state time range, determining that the digital video recorder storing state is in the prohibited state; and performing one or more of the following:
- determining the digital video recorder storing state based on the more strict rule of either a small nested region or a larger region;
- determining the digital video recorder storing state based on the less strict rule of either the small nested region or the larger region;
- determining the digital video recorder storing state based on a rule of the larger region superseding a rule of the small nested region; and/or
- determining the digital video recorder storing state based on the rule of the small nested region superseding the rule of the larger region;

in response to the digital video recorder storing state being the prohibited state, disabling transfer of video data to the digital video recorder; and in response to the digital video recorder storing state being not the prohibited state, enabling transfer of the video data from the outward facing video camera to the digital video recorder for storage.

17. A computer program product, the computer program product being embodied in a non-transitory computer readable storage medium and comprising computer instructions for:

receiving video data from an outward facing vehicle camera;

receiving location data from a geolocation device;

determining a digital video recorder storing state, wherein the digital video recorder storing state is determined based at least in part on a time and/or a date, comprising:
- determining whether the digital video recorder storing state is in a prohibited state based on the location being located within a geofenced region, the time and/or the date, comprising to:
  performing one or more of the following:
  1) determining whether a location is located within the geofenced region; and
     in the event that the location is located within the geofenced region, determining that the digital video recorder storing state is in the prohibited state;
  2) determining whether the date falls within a prohibited state date range; and
     in the event that the date falls within the prohibit state date range, determining that the digital video recorder storing state is in the prohibited state; and/or
  3) determining whether the time falls within the prohibited state time range; and
     in the event that the time falls within the prohibit state time range, determining that the digital video recorder storing state is in the prohibited state; and performing one or more of the following:
- determining the digital video recorder storing state based on the more strict rule of either a small nested region or a larger region;
- determining the digital video recorder storing state based on the less strict rule of either the small nested region or the larger region;
- determining the digital video recorder storing state based on a rule of the larger region superseding a rule of the small nested region; and/or
- determining the digital video recorder storing state based on the rule of the small nested region superseding the rule of the larger region;

in response to the digital video recorder storing state being the prohibited state, disabling transfer of video data to the digital video recorder; and in response to the digital video recorder storing state being not the prohibited state, enabling transfer of the video data from the outward facing video camera to the digital video recorder for storage.

* * * * *

UNITED STATES PATENT AND TRADEMARK OFFICE
CERTIFICATE OF CORRECTION

PATENT NO. : 11,290,678 B2  
APPLICATION NO. : 17/082807  
DATED : March 29, 2022  
INVENTOR(S) : Brett Hoye Page 1 of 1

It is certified that error appears in the above-identified patent and that said Letters Patent is hereby corrected as shown below:

In the Drawings

In drawing sheet(s) 9 of 9, figure 9, block "906", delete "Regionand" of

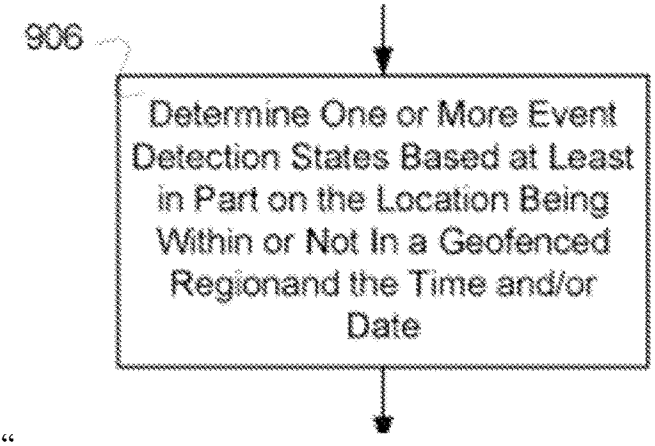

" and insert --Region and--, therefor.

Signed and Sealed this  
Ninth Day of August, 2022

Katherine Kelly Vidal  
*Director of the United States Patent and Trademark Office*